United States Patent
Wucherer

(10) Patent No.: US 10,040,730 B2
(45) Date of Patent: Aug. 7, 2018

(54) HYDROXYLAMMONIUM NITRATE MONOPROPELLANT WITH BURN RATE MODIFIER

(71) Applicant: Aerojet Rocketdyne, Inc., Sacramento, CA (US)

(72) Inventor: Edward J. Wucherer, Woodinville, WA (US)

(73) Assignee: AEROJET ROCKETDYNE, INC., Rancho Cordova, CA (US)

( * ) Notice: Subject to any disclaimer, the term of this patent is extended or adjusted under 35 U.S.C. 154(b) by 0 days.

(21) Appl. No.: 15/116,039

(22) PCT Filed: Feb. 9, 2015

(86) PCT No.: PCT/US2015/014951
§ 371 (c)(1),
(2) Date: Aug. 2, 2016

(87) PCT Pub. No.: WO2015/126644
PCT Pub. Date: Aug. 27, 2015

(65) Prior Publication Data
US 2017/0166491 A1    Jun. 15, 2017

Related U.S. Application Data

(60) Provisional application No. 61/943,041, filed on Feb. 21, 2014.

(51) Int. Cl.
*C06B 45/00* (2006.01)
*C06B 31/00* (2006.01)
*D03D 23/00* (2006.01)
*D03D 43/00* (2006.01)

(52) U.S. Cl.
CPC .................................... *C06B 31/00* (2013.01)

(58) Field of Classification Search
USPC .................................... 149/45, 109.2, 109.4
See application file for complete search history.

(56) References Cited

U.S. PATENT DOCUMENTS

| | | | |
|---|---|---|---|
| 4,158,583 A | 6/1979 | Frosch | |
| 5,487,798 A | 1/1996 | Williams | |
| 5,703,323 A | 12/1997 | Rothgery | |
| 6,179,937 B1 * | 1/2001 | Leveritt | ................ C01B 21/149 |
| | | | 149/45 |
| 2004/0200553 A1 | 10/2004 | Amtower | |
| 2004/0226280 A1 * | 11/2004 | Berg | ...................... C06B 31/00 |
| | | | 60/218 |
| 2008/0064914 A1 * | 3/2008 | Fokema | ................. B01J 23/002 |
| | | | 588/403 |

FOREIGN PATENT DOCUMENTS

| | | |
|---|---|---|
| GB | 1219050 | 1/1971 |
| WO | 0048683 | 8/2000 |

OTHER PUBLICATIONS

International Preliminary Report on Patentability for PCT Application No. PCT/US2015/014951 dated Sep. 1, 2016.
International Search Report for PCT Application No. PCT/US2015/014951 completed Apr. 25, 2015.

* cited by examiner

*Primary Examiner* — James E McDonough
(74) *Attorney, Agent, or Firm* — Joel G Landau

(57) ABSTRACT

A monopropellant includes 30-70% by weight of an oxidizer including hydroxylammonium nitrate, 5-50% by weight of a fuel, and a burn rate modifier in a non-zero amount of up to 3% by weight. The burn rate modifier can be selected from vanadium salts, iron salts, and combinations thereof. The monopropellant is a stable liquid between −20 C and 100 C at ambient pressure.

7 Claims, No Drawings

HYDROXYLAMMONIUM NITRATE MONOPROPELLANT WITH BURN RATE MODIFIER

CROSS-REFERENCE TO RELATED APPLICATIONS

The present disclosure claims priority to U.S. Provisional Patent Application No. 61/943,041, filed Feb. 21, 2014.

BACKGROUND

Liquid propellants are commonly known and used to generate thrust for rockets or other space vehicles. Propellant performance has been defined with regard to specific impulse and density; however, environmental impact and cost are now also factors in the selection of propellants.

Hydroxylammonium nitrate ("HAN") has been considered as an alternative to hydrazine-based propellant because of its relatively low toxicity, higher energy density, higher specific impulse, and lower freezing point. For example, HAN is included in propellants as an oxidizer, along with a fuel and stabilizers.

SUMMARY

A monopropellant according to an example of the present disclosure includes 30-70% by weight of an oxidizer including hydroxylammonium nitrate, 5-50% by weight of a fuel, and a burn rate modifier in a non-zero amount of up to 3% by weight. The burn rate modifier is selected from vanadium salts, iron salts, and combinations thereof. The monopropellant is a stable liquid between −20° C. and 100° C. at ambient pressure.

In a further embodiment of any of the foregoing embodiments, the burn rate modifier includes the vanadium salt.

In a further embodiment of any of the foregoing embodiments, the vanadium salt is selected from the group consisting of vanadium pentoxide, ammonium metavanadate, vanadyl acetylacetonate, vanadyl sulfate, and combinations thereof.

In a further embodiment of any of the foregoing embodiments, the burn rate modifier includes the iron salt.

In a further embodiment of any of the foregoing embodiments, the iron salt is iron nitrate.

In a further embodiment of any of the foregoing embodiments, non-zero amount of the burn rate modifier is from 5 parts-per-million to 1% by weight.

In a further embodiment of any of the foregoing embodiments, non-zero amount of the burn rate modifier is from 5 parts-per-million to 0.5% by weight.

In a further embodiment of any of the foregoing embodiments, non-zero amount of the burn rate modifier is approximately 0.1% by weight.

In a further embodiment of any of the foregoing embodiments, the burn rate modifier is dissolved in solution.

A further embodiment of any of the foregoing embodiments includes up to 2% by weight of at least one stabilizer.

In a further embodiment of any of the foregoing embodiments, the fuel includes at least one of methanol, ethanol, and glycine, the at least one stabilizer includes at least one chelating agent, and the burn rate modifier includes the vanadium salt.

A monopropellant according to an example of the present disclosure includes 30-70% by weight of an oxidizer including hydroxylammonium nitrate, 5-50% by weight of a fuel, an amount, A1, by molar fraction of at least one stabilizer, and an amount, A2, by molar fraction of a burn rate modifier selected from the group consisting of vanadium salts, iron salts, and combinations thereof. A ratio of A1 to A2 is greater than 1.0 to sustain combustion upon torch ignition in air at 1 atm pressure.

In a further embodiment of any of the foregoing embodiments, the ratio is between 7 and 35.

In a further embodiment of any of the foregoing embodiments, the burn rate modifier includes the vanadium salt.

In a further embodiment of any of the foregoing embodiments, the vanadium salt is selected from the group consisting of vanadium pentoxide, ammonium metavanadate, vanadyl acetylacetonate, vanadyl sulfate, and combinations thereof.

In a further embodiment of any of the foregoing embodiments, the burn rate modifier includes the iron salt.

In a further embodiment of any of the foregoing embodiments, the iron salt is iron nitrate.

In a further embodiment of any of the foregoing embodiments, the fuel includes at least one of methanol, ethanol, and glycine. The at least one stabilizer includes at least one chelating agent, and the burn rate modifier includes the vanadium salt.

A method of preparing a monopropellant according to an example of the present disclosure includes mixing a burn rate modifier into a stock liquid monopropellant that initially does not include any of the burn rate modifier. The stock liquid monopropellant includes an oxidizer that has hydroxylammonium nitrate, a fuel, and at least one stabilizer. The mixture includes a non-zero amount of up to 3% by weight of the burn rate modifier, 30-70% by weight of the oxidizer, 5-50% by weight of the fuel, and up to 2% by weight of the at least one stabilizer.

In a further embodiment of any of the foregoing embodiments, the burn rate modifier is selected from the group consisting of vanadium salts and iron salts.

DETAILED DESCRIPTION

A hydroxylammonium nitrate ("HAN") based stock liquid monopropellant can include HAN as an oxidizer, a fuel, and one or more stabilizers. An example of a stock liquid monopropellant is AF-M315E. Such stock monopropellant does not sustain combustion below approximately 34 atm (500 pounds per square inch). As a result, below that pressure, sustained combustion requires constant torch flame ignition and/or a pre-heated catalyst bed. In this regard, the HAN-based liquid monopropellant disclosed herein additionally includes a selected amount of a burn rate modifier to enhance combustion such that combustion can be sustained, at least for a short period of time, after ceasing torch flame ignition. The liquid monopropellant may enable open chamber combustion with the need for catalysts or pilot ignitors, and the monopropellant is a stable liquid between −20° C. and 100° C. at ambient pressure, such as at approximately 1.0 atm.

In one example, the liquid monopropellant includes:
30-70% by weight of an oxidizer including hydroxylammonium nitrate,
5-50% by weight of a fuel,
up to 2% by weight of at least one stabilizer, and
a burn rate modifier in a non-zero amount of up to 3% by weight.

The burn rate modifier can be selected from vanadium salts, iron salts, and combinations thereof. The vanadium salt can be vanadium pentoxide ($V_2O_5$), ammonium metavanadate ($NH_4VO_3$), vanadyl acetylacetonate ($VO(C_5H_7O_2)_2$), vanadyl sulfate ($VOSO_4$), or combinations thereof. The iron salt can be iron nitrate ($Fe(NO_3)_3 \cdot 9H_2O$). In further examples, the liquid monopropellant can include only the example constituents, along with any trace impurities.

The vanadium or iron salt is fully or partially dissolved in the liquid monopropellant. Depending on the amount of vanadium or iron salt used and the amounts of the other constituents in the liquid monopropellant, a portion of the vanadium or iron salt may not dissolve and can remain as a solid in the liquid monopropellant. If solids are not desired, the amount of vanadium or iron salt used can be reduced to a level below the solubility limit.

In further examples, the non-zero amount of the burn rate modifier is from 5 parts-per-million to 1% by weight, 5 parts-per-million to 0.5% by weight, or approximately 0.1% by weight.

In further examples, the fuel includes at least one of methanol, ethanol, and glycine, the stabilizer includes at least one chelating agent. Stabilizers and chelating agents can include, but are not limited to, ammonium thiosulfate, ethylenediamine tetraacetic acid (EDTA), cyclohexanediaminetetraacetic acid (CDTA), 2,2'-dipyridyl, 2-hydroxypyridine-N-oxide, Dequest®, or combinations thereof. Additional examples can be found in U.S. Pat. No. 6,179,937.

In another example, a liquid monopropellant includes,
30-70% by weight of an oxidizer including hydroxylammonium nitrate,
5-50% by weight of a fuel,
an amount, A1, by molar fraction of at least one stabilizer, and
an amount, A2, by molar fraction of a burn rate modifier.

It is to be understood that the molar fractions are the molar percentages of the given constituent relative to the total number of moles of each constituent.

The burn rate modifier is selected from vanadium salts, iron salts, and combinations thereof, and the amounts A1 and A2 are selected to be within a predetermined ratio in order to sustain combustion of the liquid monopropellant, for at least a short time, upon torch ignition in air at 1 atm pressure. In one example, the ratio of A1 to A2 (i.e., A1/A2) is greater than 1.0. HAN-based propellants have an inherent instability. The stabilizers increase the stability, but the burn rate modifier counteracts that increase in stability. Thus, in order to achieve sustained combustion of the liquid monopropellant, proper amounts of stabilizer and burn rate modifier, as represented by the ratio, are used to balance the stabilizing effect of the stabilizers and the de-stabilizing effect of the burn rate modifier. For example, when the ratio is less than 1.0 there is burn rate enhancement but poor propellant stability. When the ratio is greater than 1.0 (i.e., excess stabilizer) there is acceptable stability and acceptable burn-rate enhancement. In one further examples, the ratio is between 7 and 35.

In example experiments, liquid propellant mixtures according to this disclosure were each poured into burn cups and ignited with a propane torch. The propane torch was removed and the liquid propellants continued to burn up to approximately 2 or 3 seconds after removal.

The liquid monopropellant disclosed herein can be prepared from the stock monopropellant that does not initially have any of the burn rate modifier. For example, an amount of the burn rate modifier can be mixed into the stock monopropellant to produce the liquid monopropellant in accordance with the examples herein.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A monopropellant comprising: 30-70% by weight of an oxidizer including hydroxylammonium nitrate; 5-50% by weight of a fuel; an amount, A1, by molar fraction of at least one stabilizer; and an amount, A2, by molar fraction of a burn rate modifier selected from the group consisting of vanadium salts, iron salts, and combinations thereof, wherein a ratio of A1 to A2 is greater than 1.0 to sustain combustion upon torch ignition in air at 1 atm pressure.

2. The monopropellant as recited in claim 1, wherein the ratio is between 7 and 35.

3. The monopropellant as recited in claim 1, wherein the burn rate modifier includes the vanadium salt.

4. The monopropellant as recited in claim 2, wherein the vanadium salt is selected from the group consisting of vanadium pentoxide, ammonium metavanadate, vanadyl acetylacetonate, vanadyl sulfate, and combinations thereof.

5. The monopropellant as recited in claim 1, wherein the burn rate modifier includes the iron salt.

6. The monopropellant as recited in claim 5, wherein the iron salt is iron nitrate.

7. The monopropellant as recited in claim 1, wherein the fuel includes at least one of methanol, ethanol, and glycine, the at least one stabilizer includes at least one chelating agent, and the burn rate modifier includes the vanadium salt.

* * * * *